(12) United States Patent
Burke et al.

(10) Patent No.: US 7,647,304 B2
(45) Date of Patent: Jan. 12, 2010

(54) ADAPTIVE PICKER FOR SELECTING DATA IN DISPARATE INFORMATION SYSTEMS

(75) Inventors: Jonah S. Burke, Seattle, WA (US); Arshish C. Kapadia, Issaquah, WA (US); Howard M. Crow, Sammamish, WA (US); Targo Tennisberg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 818 days.

(21) Appl. No.: 11/222,702

(22) Filed: Sep. 9, 2005

(65) Prior Publication Data

US 2007/0061295 A1 Mar. 15, 2007

(51) Int. Cl.
G06F 7/00 (2006.01)
(52) U.S. Cl. ............................... 707/3; 707/10
(58) Field of Classification Search ............... 707/1–10, 707/102, 200
See application file for complete search history.

(56) References Cited

U.S. PATENT DOCUMENTS

| | | | |
|---|---|---|---|
| 6,230,171 B1 | 5/2001 | Pacifici et al. | |
| 6,438,580 B1 | 8/2002 | Mears et al. | |
| 6,900,819 B2 | 5/2005 | Marshall et al. | |
| 2002/0138479 A1* | 9/2002 | Bates et al. | 707/5 |
| 2003/0018632 A1 | 1/2003 | Bays et al. | |
| 2006/0149657 A1* | 7/2006 | Weild | 705/37 |
| 2007/0061296 A1 | 3/2007 | Burke et al. | |

OTHER PUBLICATIONS

Patent Cooperation Treaty "PCT International Search Report" for International Application No. PCT/US2006/034975, Date of mailing of the international search report Feb. 26, 2007, Authorized Officer Mun, Hyeong Sub.

* cited by examiner

*Primary Examiner*—Wilson Lee

(57) ABSTRACT

An adaptive picker for selecting data in disparate information systems is provided. The adaptive picker may be implemented by an application to pick items from one or more data stores, which are associated with other applications. The adaptive picker determines items provided by the data store that are available for picking and the types of data associated with the items. The adaptive picker receives key information provided by a user through the first application and searches for the available items based on the key information. The adaptive picker also filters the items to identify a desired item. The adaptive picker can determine the filtering capabilities associated with the data stores and automatically adapt to these filtering capabilities. The adaptive picker can retrieve a desired item with a key information search that matches the key information with a unique identifier associated with desired item. The key information search enables a user to pick an item without browsing. If the search returns multiple items, the adaptive picker can provide a disambiguation menu for selecting the desired. The search results can also be filtered by context determined by the adaptive filter. The context may include any parameter, such as the identity of a user, the time of day, an application the user is working within, an organizational discipline of the user, or the like.

19 Claims, 10 Drawing Sheets

ADAPTIVE PICKER FOR SELECTING DATA IN DISPARATE INFORMATION SYSTEMS

CROSS-REFERENCE TO RELATED APPLICATION(S)

This application is related to U.S. Non-provisional application Ser. No. 11/191,771, filed on Jul. 28, 2005, the content of which is hereby incorporated by reference.

BACKGROUND

Applications in today's computing environment enable users to perform more tasks than ever before. To effectively perform a task with a given application, it is often desirable to access and use data that are generated and managed by other applications. Enabling one application to pick data handled by another application is typically not an easy undertaking. Generally, the picker component is tightly bound to the data source's application programming interface (API) and the user interface of the component is tailored to the type of data being picked. This tight binding presents a problem in dynamic applications, such as portal applications, where users want to connect to new data sources and pick new data types without writing code.

An effective solution for providing the ability for picking data from disparate data sources without undue complexity continues to elude those skilled in the art.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides an adaptive picker for selecting data in disparate information systems. The adaptive picker may be implemented by an application to pick items from one or more data stores, which are associated with other applications. The adaptive picker determines items provided by the data store that are available for picking and the types of data associated with the items. The adaptive picker receives key information provided by a user through the first application and searches for the available items based on the key information. The adaptive picker also filters the items to identify a desired item. The adaptive picker can determine the filtering capabilities associated with the data stores and automatically adapt to these filtering capabilities. The adaptive picker can retrieve a desired item with a key information search that matches the key information with a unique identifier associated with desired item. This search enables a user to pick an item without browsing. If the search returns multiple items, the adaptive picker can provide a disambiguation menu for selecting the desired item. The search results can also be filtered by context determined by the adaptive picker. The context may include any context parameter, such as the identity of a user, the time of day, an application the user is working within, an organizational discipline of the user, or the like.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
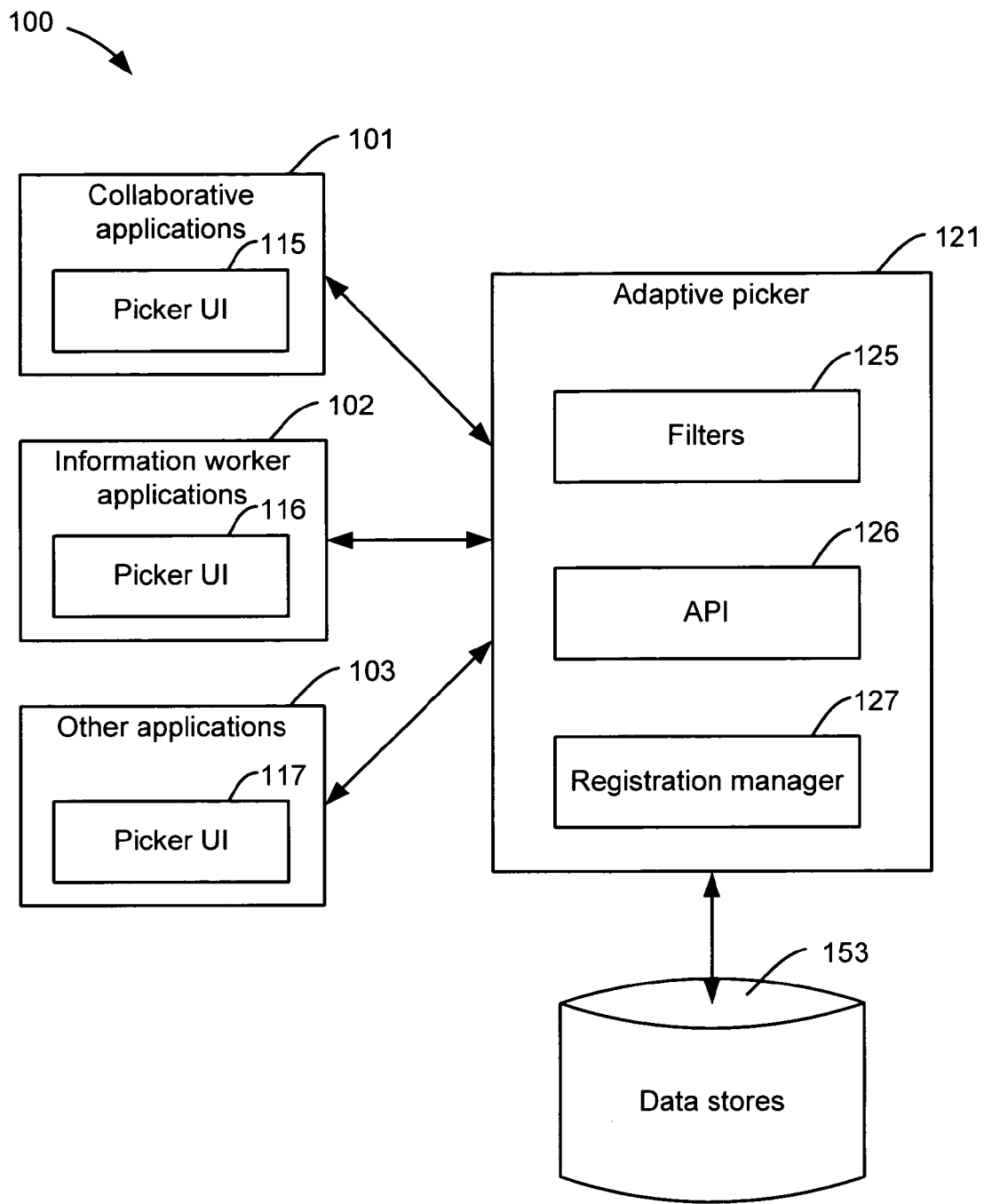
FIG. 1 shows an example system for enabling an application to pick data provided by difference types of data providers.

FIG. 1 shows an example system 100 for enabling an application to pick data provided by difference types of data providers. The picking functionalities of system 100 may be provided to any type of applications, such as collaborative applications 101, information worker applications 102, and other applications 103. Collaborative applications 101 are applications that provide resources and services that are accessible by multiple users. Collaborative applications 101 typically enable users to share information with each other by providing a central location where data can be accessed. Collaborative applications 101 include web portal applications, such as SHAREPOINT products and technologies provided by MICROSOFT®. Information worker applications include any application that enables user to process data, such as email and other communication applications, word and data processors, presentation tools, media applications, and the like. Applications 101-103 are configured with picker user interfaces (UIs) 115-117, which interact with adaptive picker 121.

Adaptive picker 121 is configured to enable applications 101-103 to pick data from disparate data sources, such as data stores 153. As shown in FIG. 1, adaptive picker 124 may include filters 125, application user interface (API) 126, and registration manager 127. Adaptive picker 121 is configured to interact with data stores 153 using API 126. API 126 is configured to interact with any type of data stores and to determine metadata associated with the data in data stores 153. The metadata may include any information about the data in data stores 153, such as data types, formats, or the like. The determined metadata may also identify and describe what items in data stores 153 are available for picking. The items can be any type of data in data stores 153, such as records, documents, files, and the like. Adaptive picker 121 is configured to enable users to pick available items in data stores 153. Adaptive picker 121 interacts with the users through picker UIs 115-117. An example picker UI will be discussed below in conjunction with FIG. 5-9.

Adaptive picker 121 may include many different mechanisms for determining the items available for picking. For example, adaptive picker 121 may be configured to gather information about the data that are provided in data stores 153. Adaptive picker may also include registration manager 127 to handle metadata from data stores 153. Registration manager 127 is configured to enable data stores 153 to register with adaptive picker 121. Data stores may identify items that are available for picking in the registration. Registration manager 127 may be configured to maintain information about the items that are available from each data store and to provide these items for picking. Adaptive picker 121 is then configured to retrieve data associated with the picked items from data stores 153.

Adaptive picker 121 is configured with various mechanisms for picking items from data stores 153. For example, adaptive picker 121 is configured to pick items with a key. This mechanism enables a user to pick data without browsing by simply entering a key in the picker UI. Adaptive picker 121 may also be configured to retrieve a set of close matching items associated with the key where there are multiple items associated with the key. This mechanism allows a user to select a desired item from the set of returned items. For example, adaptive picker 121 may configure a picker UI to show a disambiguation menu in response to the user entering a non-unique key.

Adaptive picker 121 is also configured to pass data retrieved from data store 153 through a set of filters. Adaptive picker 121 can employ one or more of these filters to filter the retrieved data, such as by exact match, by wildcard, by range, by user, and the like. Filtering the results enables a user to pick from a set of relevant items associated with a search, without inundated the user with items that are not relevant to the search terms or the user. Example filters will be discussed below in conjunction with FIG. 2.

Adaptive picker 121 is configured to determine filtering capabilities associated with data stores 153 and to automatically adjust the filtering based on the determined filtering capabilities. In this manner, when a new data store is added or if the existing data stores are modified with new capabilities, adaptive picker 121 can automatically determine and provide new filtering experience to the user without requiring new code. Adaptive picker 121 is also configured to determine context information about the user and applications 101-103. The context information may include specific information about the user, the applications 101-103 within which the user is working, the current tasks performed by the user, or the like. Adaptive picker 121 may be configured to provide the context information to data stores 153 to facilitate data filtering.

The components and their configurations shown in FIG. 1 are shown as an example. In actual implementation, different components may be used to achieve the same functionalities. For example, in another implementation, the registration manager 127 may be a separate component from adaptive picker 121. Likewise, in alternative implementation, rather than a separate component, adaptive picker 121 may be incorporated into an application.

Figure 2:
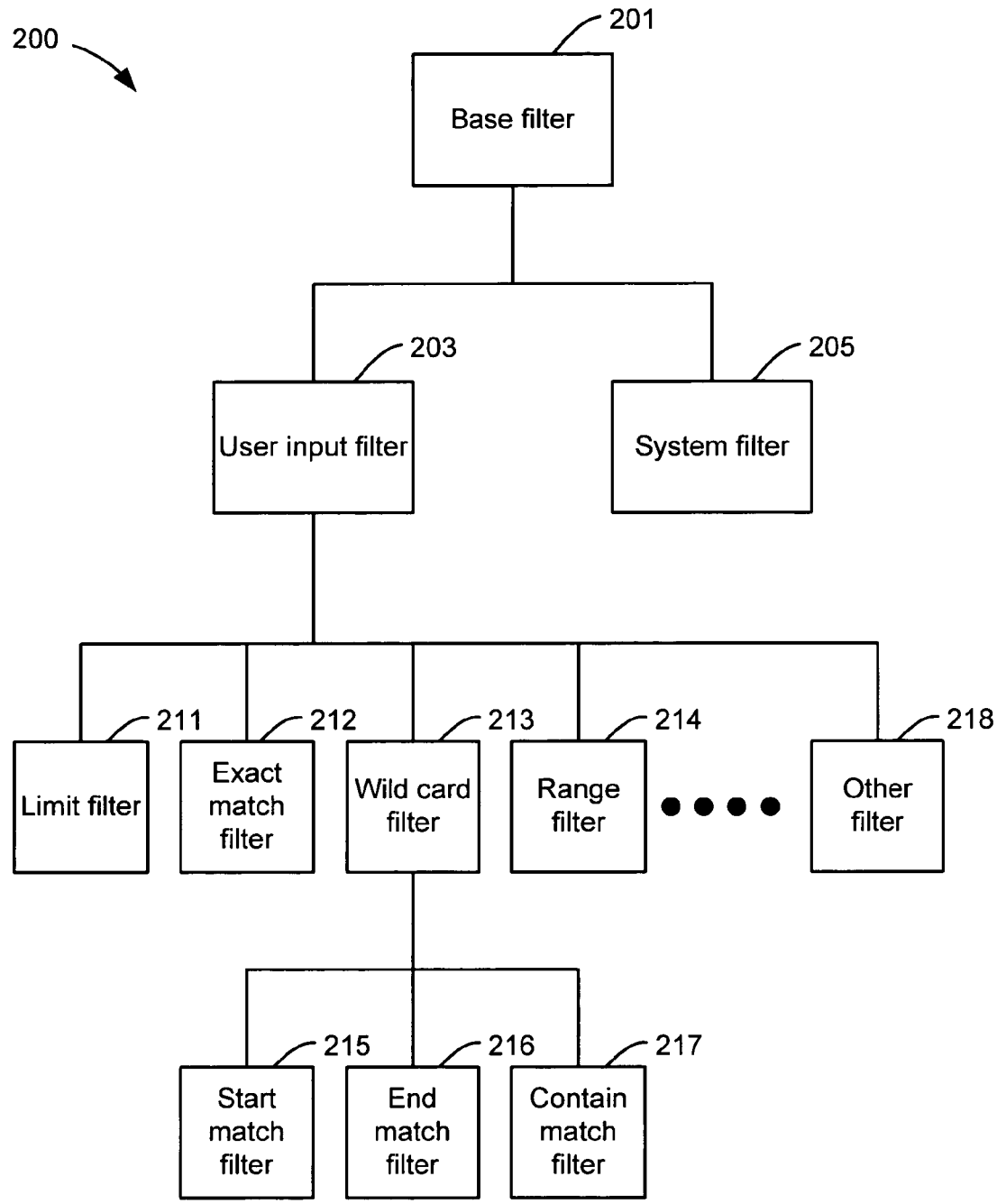
FIG. 2 shows example filters that can be implemented by the adaptive picker shown in FIG. 1.

FIG. 2 shows example filters 200 that can be implemented by adaptive picker 121 shown in FIG. 1. As illustrated in FIG. 2, an adaptive picker 121 may implement a base filter 201 that includes multiple filters. Particularly, base filter 201 may include user input filter 203 and system filter. User input filter 203 is configured for filtering search results in accordance with preferences of the user. System filter 205 is configured to filter search results according to system parameters. For example, system filter 205 may filter items returned from the search based on the context within which the user is working. For example, the context may include the identity of the user, the time of day, the application the user is working within, the organizational discipline of the user, or the like. System filter 205 may also filter out items according to other system conditions, such as data store availability, administrative preference, applicability of the items to the application from which the search was initiated, and the like.

User input filter 203 may include filters 211-218. Limit filter 211 is configured to limit the number of items returned from a search. Exact match filter 212 is configured to filter search results to obtain items that are an exact match with the search string or items with a certain field/column/characteristic that exactly matches the search string. Wild card filter 213 is configured to filter search results to identify items that include the search string. Wild card filter 213 may be configured to implement the functionalities of start match filter 215, end match filter 216, and contain match filter 217. Start match filter 215 is configured to filter search results to identify items that starts with the search string while end match filter 216 is configured to identify items that ends with the search string. Contain match filter 217 is configured to identify items that contain the search string somewhere in the middle of the data associated with the items. Range filter 214 is configured to filter search results that fall within a specified range.

Filters 200 shown in FIG. 2 may be implemented by the adaptive picker along or in combination. Example filters 200 are shown for illustrative purpose. In actual implementation, more, less or different filters may be implemented by adaptive picker 121 to achieve similar functionalities. Adaptive picker 121 does not need to implement a specific set of filters and is configured to perform the picking functionalities with any filtering capability offered by the backend systems. The abstractions provided by adaptive filter 121 described above can map to one or more backend filtering constructs.

Figure 3:
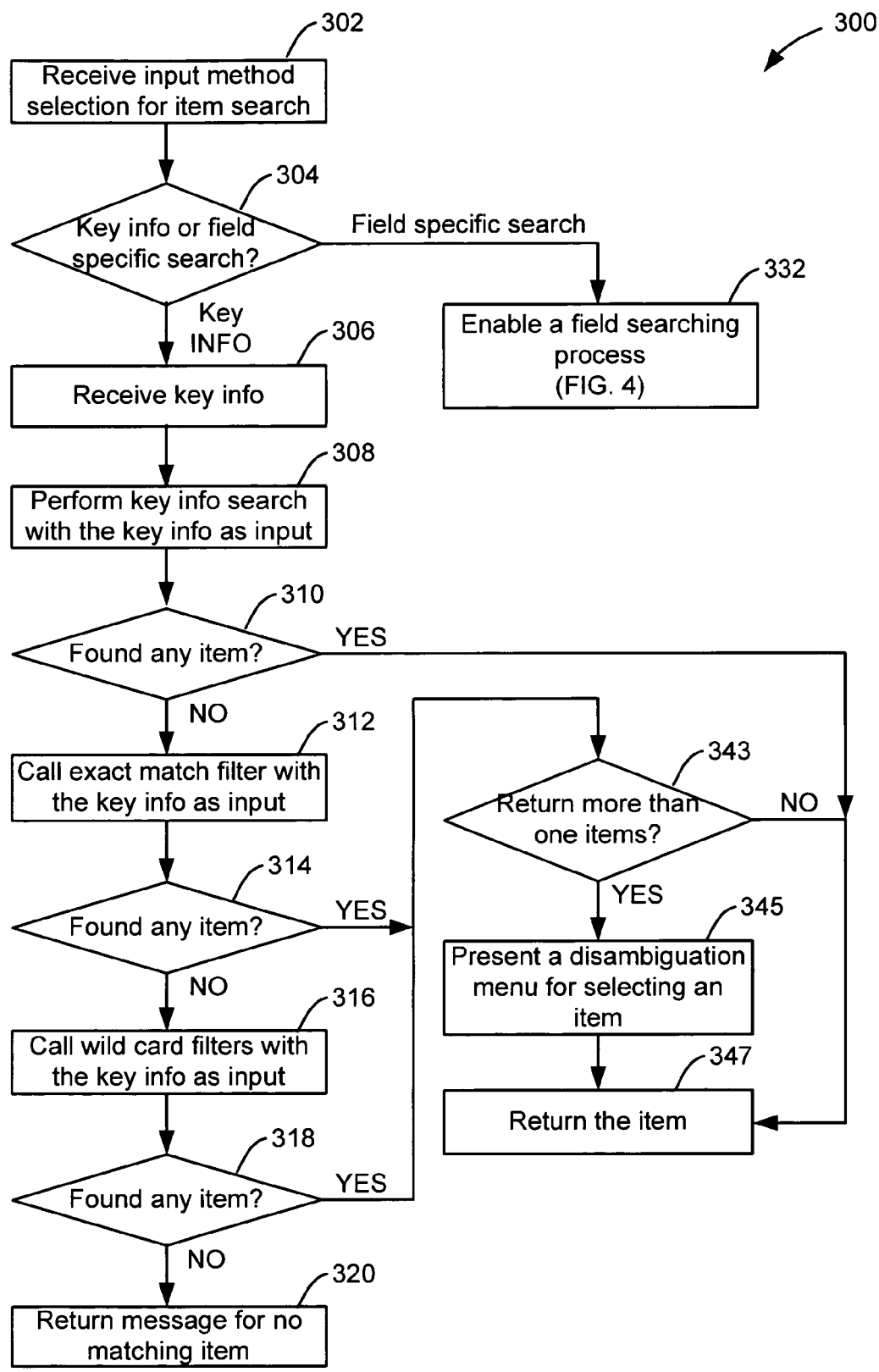
FIG. 3 shows an example process for enabling the adaptive picking of items associated with one or more data stores.

FIG. 3 shows an example process 300 for enabling the adaptive picking of items associated with one or more data stores. Process 300 may be implemented by an adaptive picker to enable users to pick items from any type of data stores.

At block 302, an input method selection for item search is received. At decision block 304, a determination is made whether the selected method is key information search or field specific search. If the selected method is field specific search, process 300 moves to block 332 where a field searching process is enabled. An example field searching process will be discussed below in conjunction with FIG. 4.

Returning to decision block 304, if the selected method is key information search, process 300 continues at block 306 where the key information is received. At block 308, a key information search is performed with the received key information as input. The key information search enables the adaptive picker to determine an item in data stores that is identified by the key information. For example, the item may be a record that is identified by an identifier unique to that record. At decision block 310, a determination is made whether any item is found by the key information search. If so, process 300 moves to decision block 343.

Returning to block 310, if no item is found by the key information search, process 300 goes to block 312 where an exact match filter is called with the key information as input. The exact match filter enables the adaptive picker to determine items that include a text string that exactly matches the text string provided in the key information. For example, items returned by the exact match filter may include a title that matches the key information. At decision block 314, a determination is made whether any item is found using the exact match filter. If so, process 300 moves to decision block 343.

Returning to block 314, if no item is found using the exact match filter, process 300 continues at block 316 where a wild card filter is called with the key information as the input. The wild card filter enables the adaptive picker to determine items with data that include a text string containing the text string provided in the key information. For example, the key information may match a portion of the title associated with the items returned by wild card filters. At decision block 318, a determination is made whether any item is found using the wild card filter. If so, process 300 moves to decision block 343. If no item is found, process goes to block 320 where a message for no matching item is returned.

At decision block 343, a determination is made whether more than one items are returned. If not, the process goes to block 347. If multiple items are returned, process 300 moves to block 345 where a disambiguation menu for selecting an item is presented. The disambiguation menu enables the user to select the exact item that is desired from among the multiple returned items. At block 347, the item selected by the process is retrieved from the data store and returned.

It is to be appreciated that process 300 also includes context filtering based on the system filters. The context is automatically determined by the adaptive picker. Values associated with the context are sent to the backend system for the searches described above.

Figure 4:
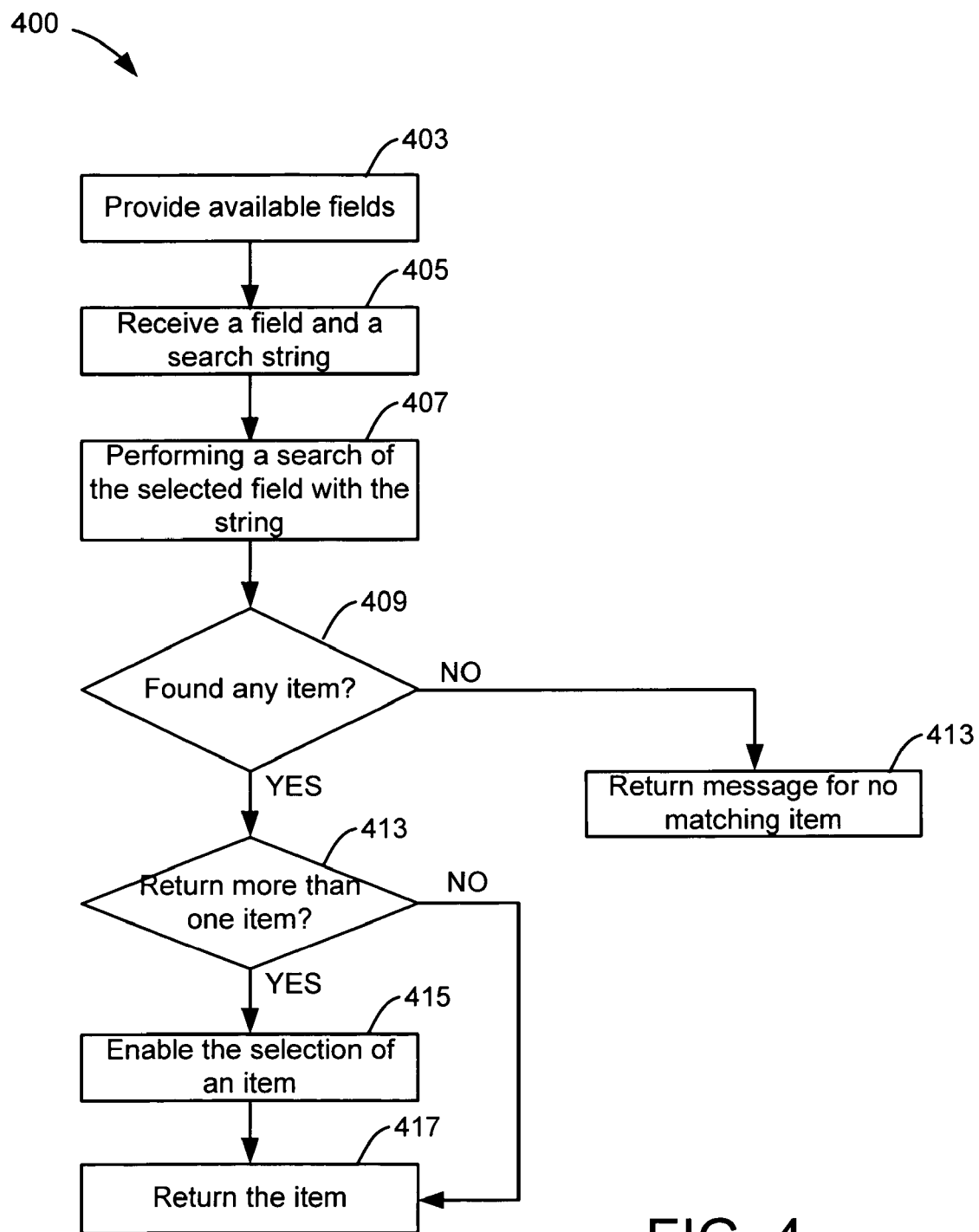
FIG. 4 shows an example process for selecting an item by field specific searching.

FIG. 4 shows an example process 500 for selecting an item by field specific searching. Process 300 may be implemented by an adaptive picker to enable users to pick items from data stores by specifying one or more fields and searching in the fields. At block 403, fields that are available for searching are provided. At block 405, a field and a search string are received. At block 407, a search of the selected field with the search string is performed. At decision block 409, a determination is made whether any item is found. If no item is found, process 400 moves to block 413 where a message for no matching item is returned.

Returning to decision block 409, if at least one item is found, process 400 moves to block 413 where a determination is made whether more than one items are found. If not, process 400 goes to block 417. If multiple items are found, process 400 goes to block 415 where the process enables a selection of an item from the multiple returned items. For example, a disambiguation menu may be presented to enable the selection. At block 417, the selected item is retrieved from the data store and returned.

Figure 5:
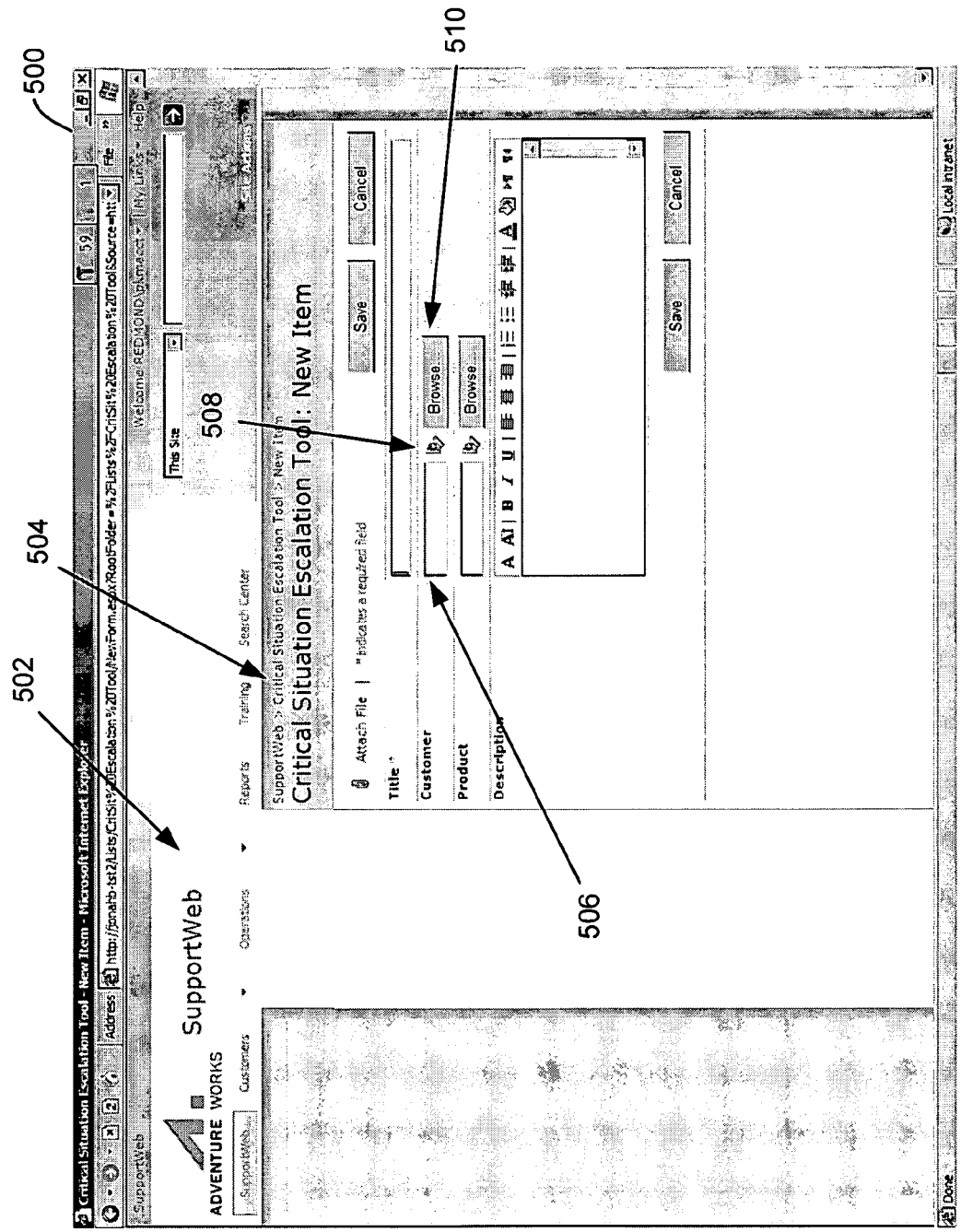
FIG. 5 shows a screenshot of an example user interface for an application that implements an adaptive picker.

FIG. 5 shows a screenshot 500 of an example user interface for an application that implements an adaptive picker. Screenshot 500 illustrates a user interface 502 for a support web application. In this example, the support web application includes a critical situation escalation tool that enables a user to organize data associated with each situation. In screenshot 500, the support web application includes add new item user interface 504 that enables a user to add a new critical situation into the application. User interface 504 enables a user to add data managed by other applications. In this example, one of the other applications is a customer relationship management (CRM) application. As shown in screenshot 500, user interface 504 enables the user to add information related to customer and product.

User interface 504 includes two mechanisms for picking items managed by the CRM application. The first is a key information searching mechanism. Key information may be entered in textbox 506. Key searching may be initiated by activating trigger 508. The string entered in textbox 506 will be used as the key information for the key searching. The second mechanism for picking items managed by the CRM application is field specific searching, which may be initiated by activating trigger 510. Field specific searching will be discussed in conjunction with FIGS. 8 and 9. As shown in screenshot 500, items associated with products may also be picked using the same mechanism.

Figure 6:
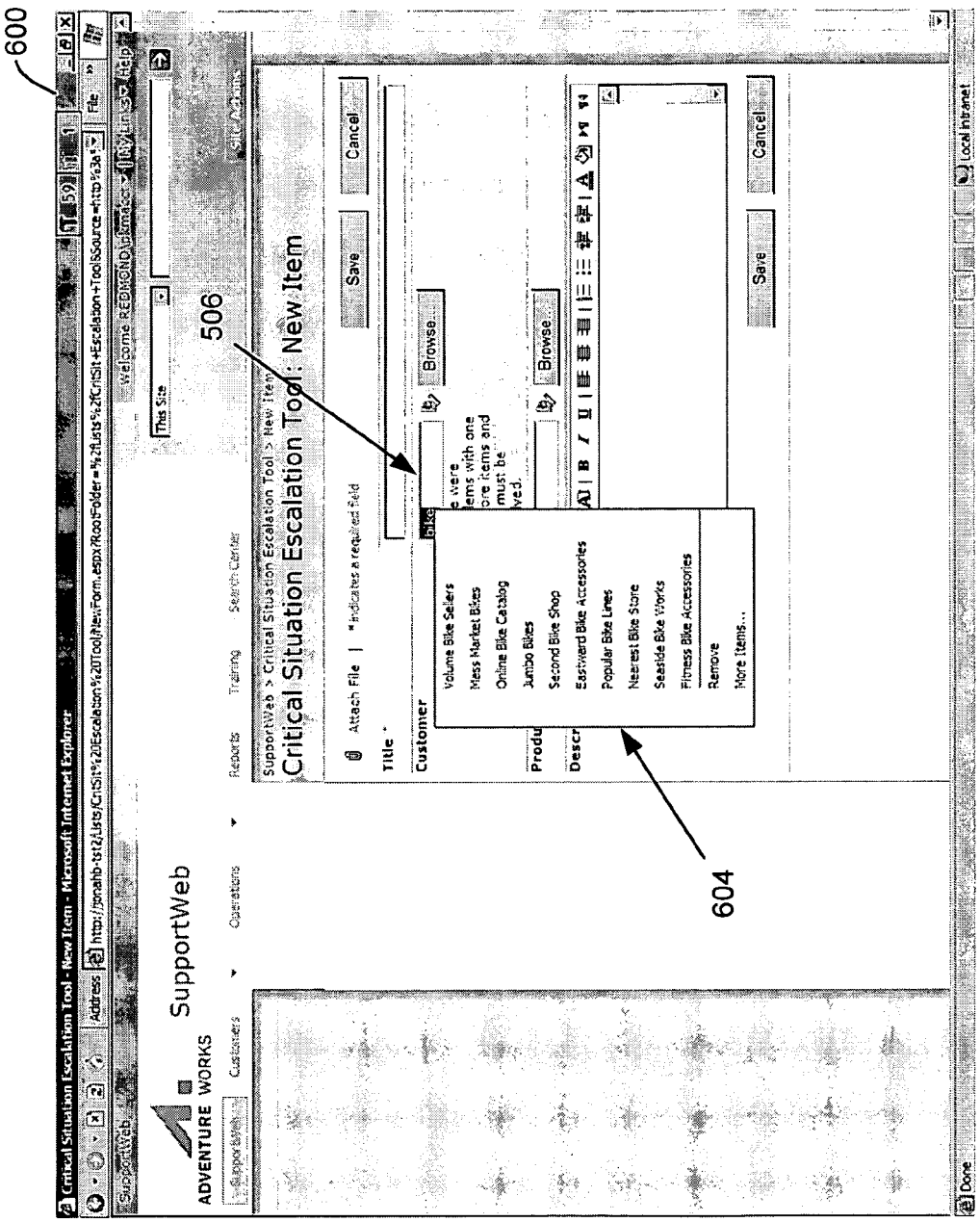
FIG. 6 shows another screenshot of the example user interface in FIG. 5.

FIG. 6 shows another screenshot 600 of the example user interface 502 in FIG. 5. Screenshot 600 illustrates a key information search being performed with user interface 502. As shown in FIG. 6, key information has been entered in textbox 506 for searching items in the data store that contains customer data. The key information contains a text string "bike". This text string causes the search to return multiple items associated with different customers. The adaptive picker implemented by the application enables a selection among the multiple items by presenting a disambiguation menu 604. As shown in screenshot 600, disambiguation menu 604 displays the items returned from the key information search. The items are displayed as selectable objects in the disambiguation menu 604. A user may pick the desire item by selecting the corresponding object in the disambiguation menu.

Figure 7:
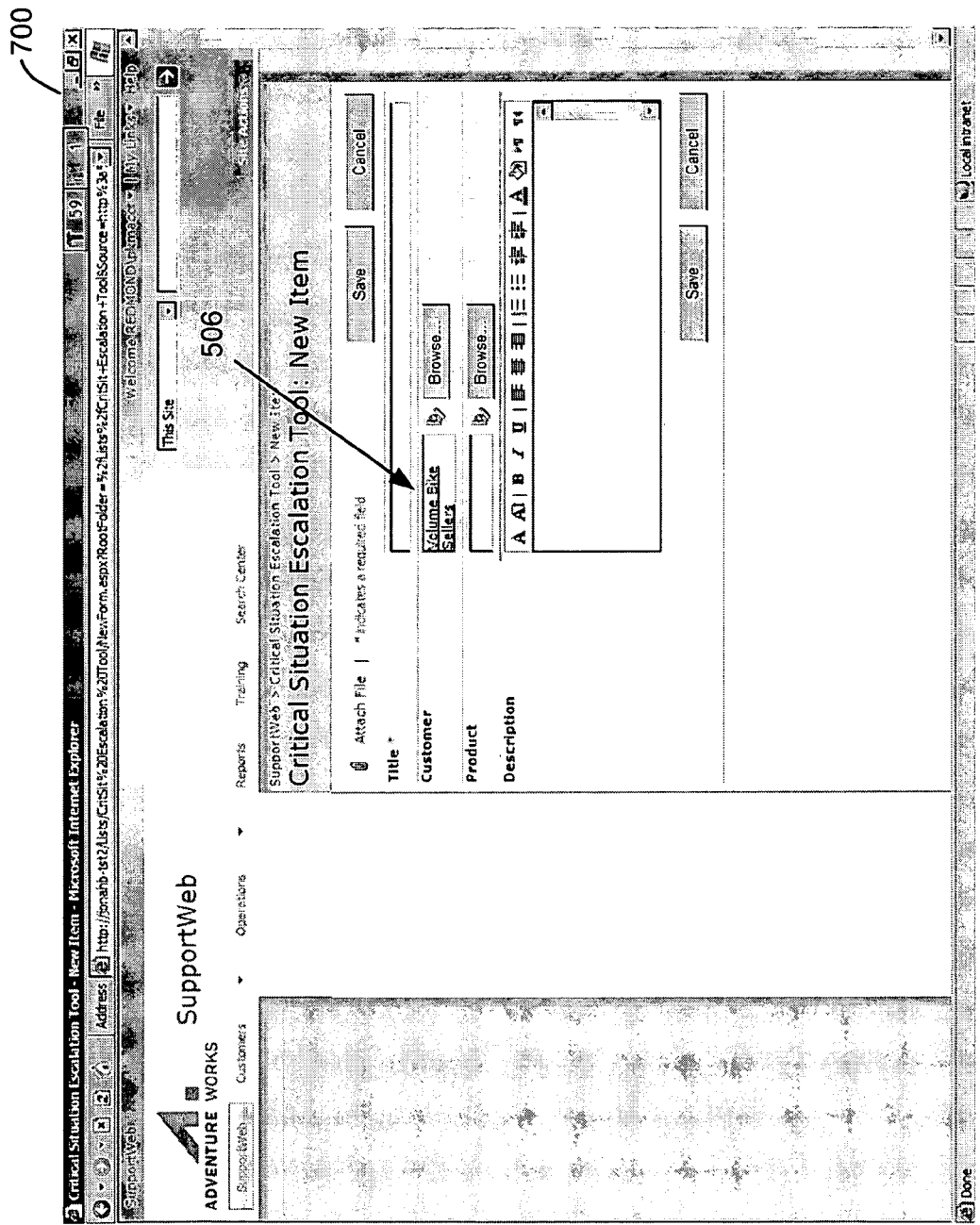
FIG. 7 shows a further screenshot of the example user interface in FIG. 5.

FIG. 7 shows a further screenshot 700 of the example user interface 503 in FIG. 5. Screenshot 700 illustrates that an item in disambiguation menu 604 has been selected from among the multiple items returned from the key information search. Textbox 506 includes the item "Volume Bike Sellers", which has been selected. The user may continue to enter information about the particular new entry in the critical situation escalation tool. For example, the user may perform another key information search for a product item similar to process for selecting the customer item.

Figure 8:
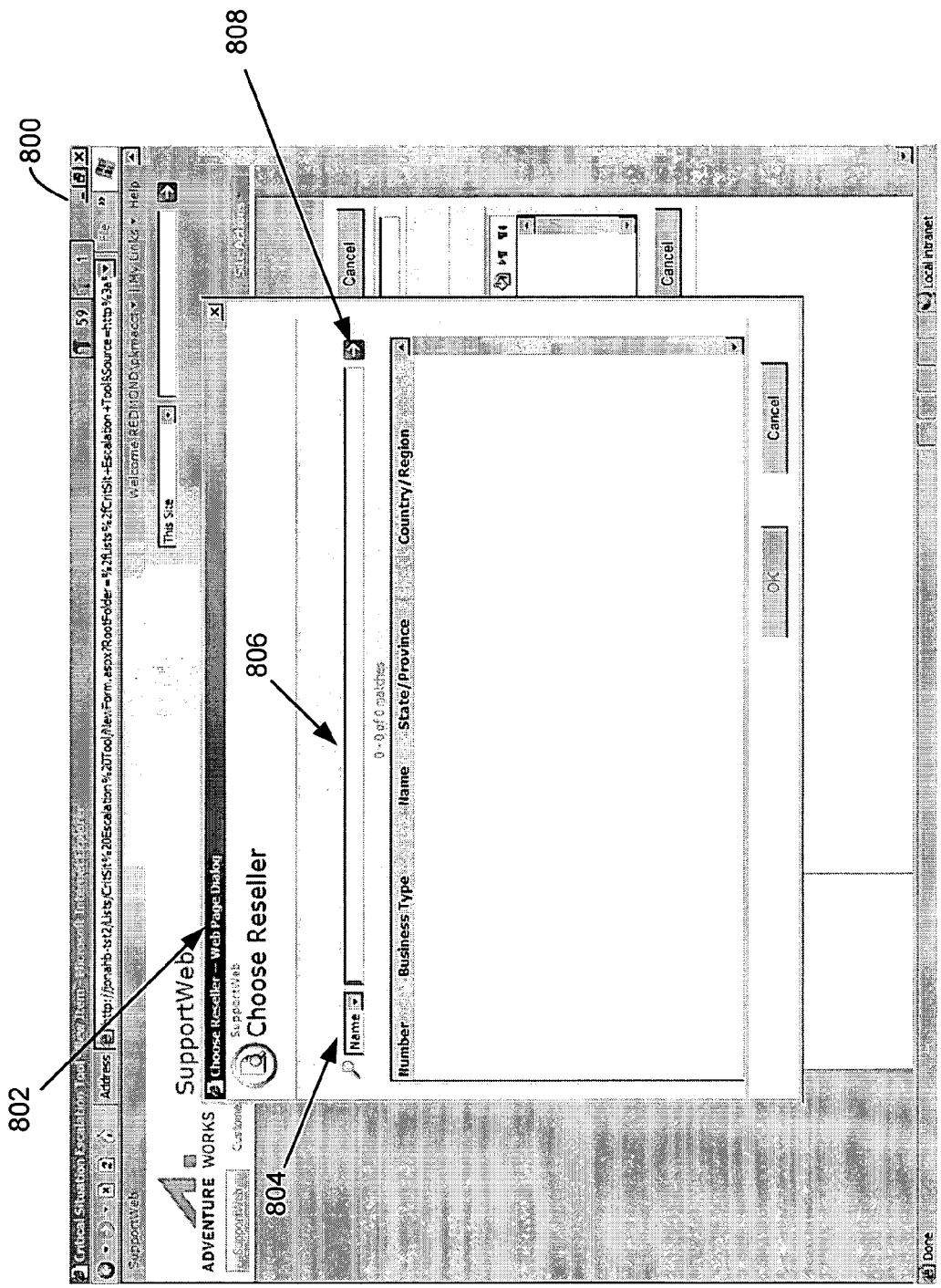
FIG. 8 shows a screenshot of the example user interface in FIG. 5 performing a field specific search.

FIG. 8 shows a screenshot 800 of the example user interface 503 in FIG. 5 performing a field specific search. Screenshot 800 illustrates field specific search user interface 802, which is presented in response to selecting trigger 510 shown in FIG. 5. A field specific search enables items in data stores to be searched based on one or more fields in the data stores. For example, a data store with customer data may contain multiple fields, such as name, business types, record identifiers, location information, and the like. A field specific search may be performed on only one or a limited number of fields to restrict the number of returned items and to decrease the probability of returning items that are not desirable.

As shown in FIG. 8, user interface 802 may include a field selector 804 and a textbox 806. Field selector 804 is configured to display all of the fields available in the data stores. Field selector 804 enables a user to select one or more available fields to be searched. The user may enter a string in textbox 806 as a search key for searching in the selected field. The field-specific search may be initiated by activating trigger 808.

Figure 9:
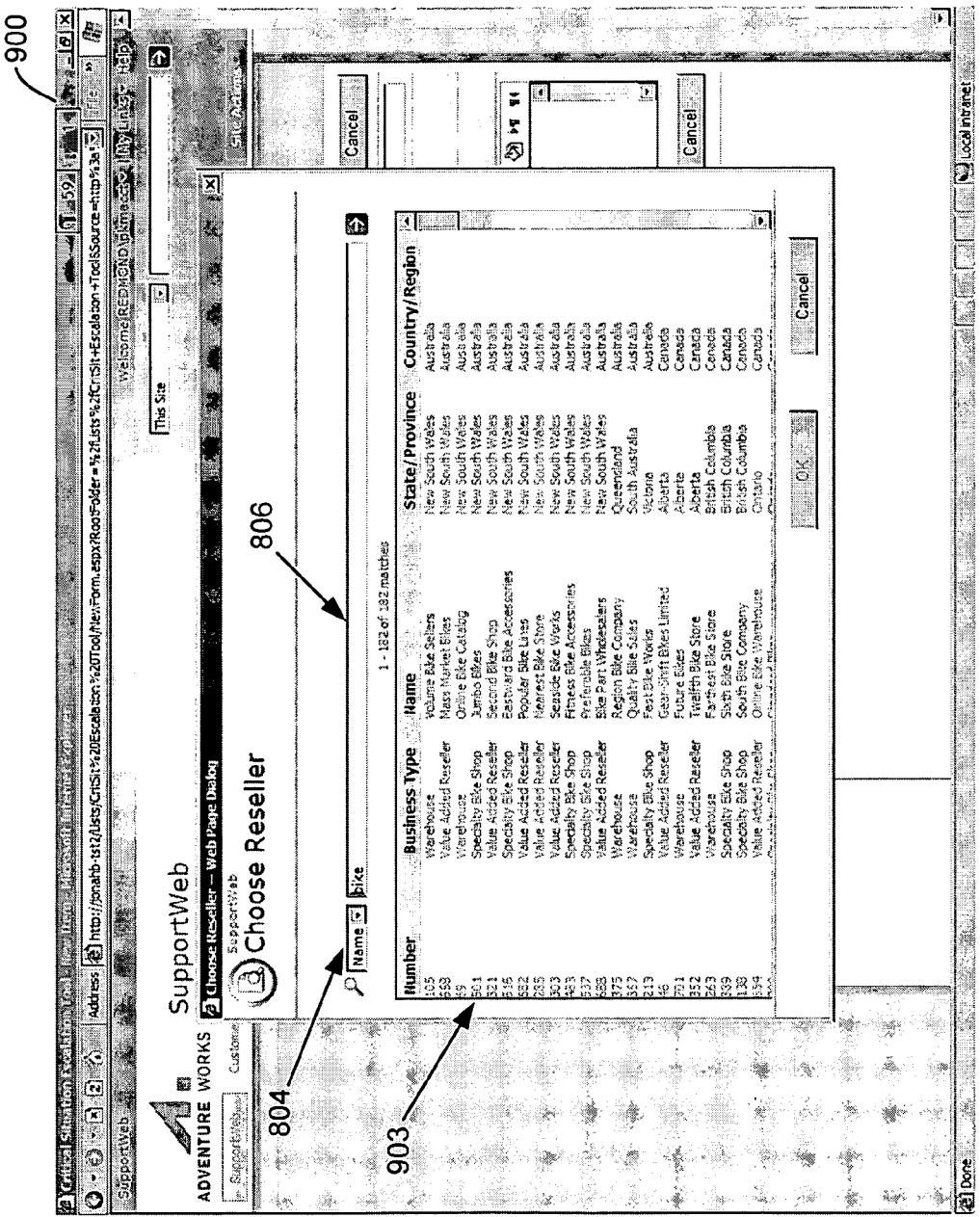
FIG. 9 shows another screenshot of the example user interface in FIG. 5 performing the field-specific search.

FIG. 9 shows another screenshot 900 of the example user interface 503 in FIG. 5 performing the field-specific search. Screenshot 900 illustrates that the "name" field has been selected with field selector 804 and a text string of "bike" has been entered in textbox 806. Items returned from the field-specific search are shown in area 903. As shown in FIG. 9, the items are shown with data in the selected field but also with data in other fields. Each of the items is shown in area 903 as selectable object. A user may select the desired item among the multiple returned items.

Figure 10:
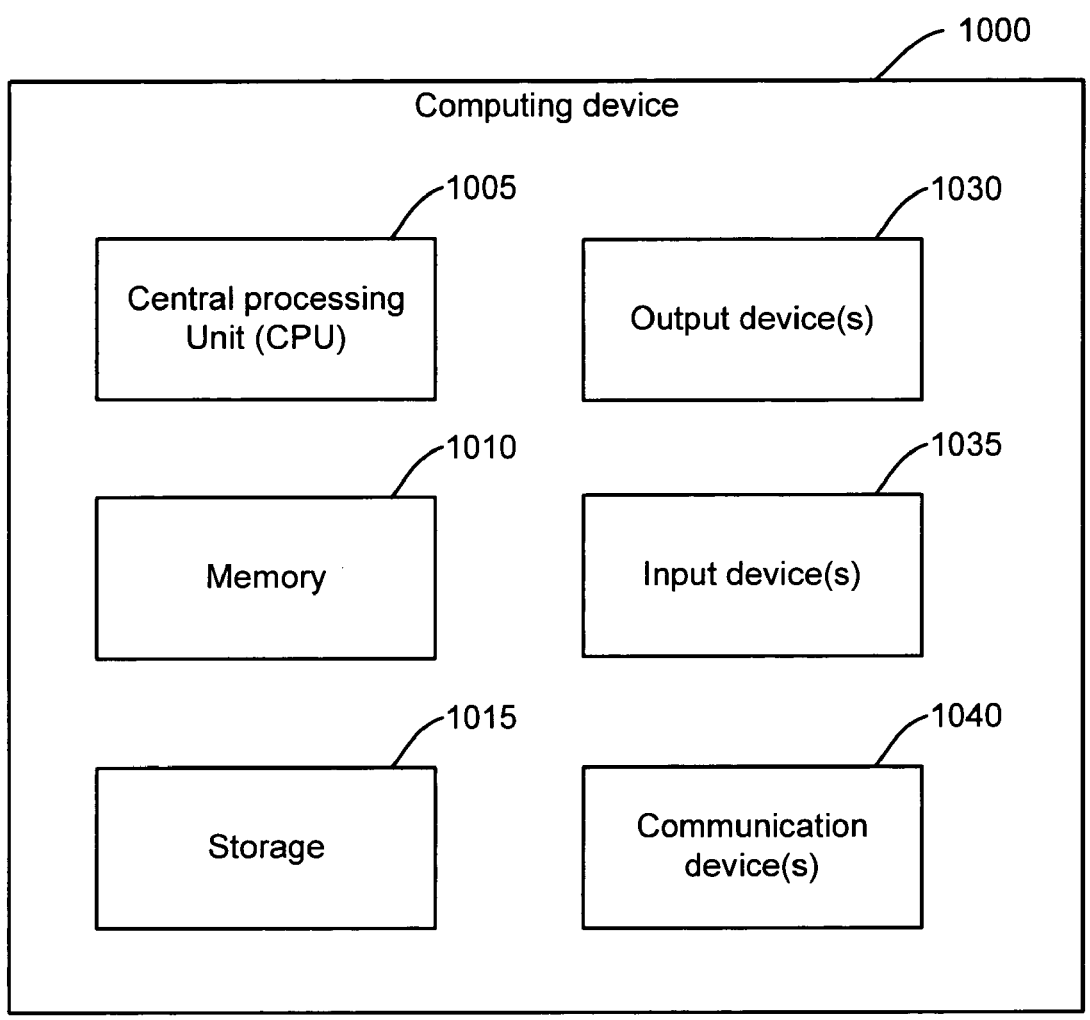
FIG. 10 shows an example computer device for implementing the described systems and methods.

FIG. 10 shows an example computer device 1000 for implementing the described systems and methods. In its most basic configuration, computing device 1000 typically includes at least one central processing unit (CPU) 1005 and memory 1010.

Depending on the exact configuration and type of computing device, memory 1010 may be volatile (such as RAM), non-volatile (such as ROM, flash memory, etc.) or some combination of the two. Additionally, computing device 1000 may also have additional features/functionality. For example, computing device 1000 may include multiple CPU's. The described methods may be executed in any manner by any processing unit in computing device 1000. For example, the described process may be executed by both multiple CPU's in parallel.

Computing device 1000 may also include additional storage (removable and/or non-removable) including, but not limited to, magnetic or optical disks or tape. Such additional storage is illustrated in FIG. 10 by storage 1015. Computer storage media includes volatile and nonvolatile, removable and non-removable media implemented in any method or technology for storage of information such as computer readable instructions, data structures, program modules or other data. Memory 1010 and storage 1015 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 1000. Any such computer storage media may be part of computing device 1000.

Computing device 1000 may also contain communications device(s) 1040 that allow the device to communicate with other devices. Communications device(s) 1040 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 1000 may also have input device(s) 1035 such as keyboard, mouse, pen, voice input device, touch input device, etc. Output device(s) 1030 such as a display, speakers, printer, etc. may also be included. All these devices are well know in the art and need not be discussed at length.

While the preferred embodiment of the invention has been illustrated and described, it will be appreciated that various changes can be made therein without departing from the spirit and scope of the invention.

The invention claimed is:

1. At least one device-readable computer storage media encoded with device-executable instructions that when executed by a processing unit performs steps comprising:
    identifying available items from a data store associated with a first application among a plurality of disparate data stores, wherein the identifying comprises determining metadata associated with the data store that identifies the available items;
    receiving an selection through a second application to pick a desired item;
    receiving key information associated with the desired item;
    performing a search of the available items using the key information;
    filtering results of the search with at least one filter;
    identifying the desired item from the results;
    retrieving data associated with the desired item from the data store;
    providing the retrieved data to the second application;
    modifying the data store with new filtering capabilities;
    determining the filtering capabilities associated with the modified data store; and
    automatically adjusting the filtering based on the determined filtering capabilities.

2. The at least one device-readable computer storage media as recited in claim 1, further comprising:
    receiving an identifier uniquely associated with the desired item as the key information; and
    performing a key information search with the identifier.

3. The at least one device-readable computer storage media as recited in claim 1, further comprising:
    performing an exact match search based on the key information; and
    identifying the desired item that exactly matches the key information.

4. The at least one device-readable computer storage media as recited in claim 1, further comprising:
    performing a wild card search based on the key information;
    identifying a plurality of items corresponding to the key information; and
    providing the plurality of items in a disambiguation menu for a selection of the desired item.

5. The at least one device-readable computer storage media as recited in claim 1, further comprising:
    receiving a selected field associated with the items from the data store;
    performing a search of the data associated with selected field based on the key information; and
    identifying a plurality of items that correspond to the key information.

6. The at least one device-readable computer storage media as recited in claim 5, further comprising:
    presenting the plurality of identified items as selectable objects in a user interface; and
    receiving a selection of the desired item from the user interface.

7. The at least one device-readable computer storage media as recited in claim 1, wherein the available items, data types and filters are identified by a registration manager.

8. The at least one device-readable computer storage media as recited in claim 1, wherein the filtering step is performed with at least one of a user input filter, a system filter, a limit filter, an exact match filter, a wild card filter, a start match filter, an end match filter, a contain match filter, and a range filter.

9. The at least one one or more device-readable computer storage media as recited in claim 8, wherein the system filter is configured to filter items based on a context.

10. The at least one device-readable computer storage media as recited in claim 9, wherein the context includes at least one of identity of a user, time of day, an application the user is working within, or an organizational discipline of the user.

11. The at least one one or more device-readable computer storage media as recited in claim 1, wherein the second application is at least one of a collaborative application, a web portal application, an information worker application, a client application, or a server application.

12. A computer-implemented method for a first application to interact with a user, the method comprising:
   providing a user interface associated with an adaptive picker, the adaptive picker including information about items provided by a data store stored in a memory associated with a second application among a plurality of disparate data stores;
   enabling key information to be entered for picking a desired item;
   in response to receiving the key information,
      determining by a processing unit at least one item corresponding to the key information, the determining comprising filtering results of a search based on the key information; and
      retrieving data associated with the desired item from the data store;
   modifying the data store with new filtering capabilities;
   determining the filtering capabilities associated with the modified data store; and
   automatically adjusting the filtering based on the determined filtering capabilities.

13. The computer-implemented method as recited in claim 12, further comprising:
   in response to determining a plurality of items corresponding to the key information,
      providing the plurality of items in a disambiguation menu; and
      enabling a selection of the desired item from among the plurality of determined items.

14. The computer-implemented method as recited in claim 12, further comprising:
   providing a plurality of fields associated with the items provided by the data store;
   enabling a selection of at least one of the fields;
   enabling a search string to be entered;
   in response to receiving a selection of a field and a search string,
      determining items based on a search of the selected field with the search string; and
      enabling a selection of the desired item from among the plurality of determined items.

15. The computer-implemented method as recited in claim 14, wherein the fields include at least one of record identifiers, business type, name, and address information.

16. The computer-implemented method as recited in claim 15, further comprising displaying data in the selected field associated with the items.

17. The computer-implemented method as recited in claim 16, further comprising displaying data in at least one unselected field associated with the items.

18. A computing device for providing a web portal application, the computing device comprising:
   means for communicating with a data store associated with another application among a plurality of disparate data stores;
   means for determining items provided by the data store that are available for picking by determining metadata associated with the data store that identifies the available items;
   means for determining the types of data associated with the items;
   means for searching for the available items based on key information;
   means for filtering the items to identify a desired item;
   means for modifying the data store with new filtering capabilities;
   means for determining the filtering capabilities associated with the modified data store; and
   means for automatically adjusting the filtering based on the determined filtering capabilities.

19. The computing device as recited in claim 18, further comprising:
   means for determining a plurality of items from the search;
   means for providing a disambiguation menu for selecting the desired item.

* * * * *